United States Patent [19]
Weingord et al.

[11] Patent Number: 5,925,946
[45] Date of Patent: Jul. 20, 1999

[54] DAMPING INSERT AND ISOLATION PAD TO REDUCE ACOUSTIC LEVELS AND VIBRATION IN MOTOR AND DISC DRIVE

[75] Inventors: Jerry J. Weingord, Santa Cruz; Peyman K. Nejad, San Jose; Neyram Hemati, Saratoga; Donald J. Macleod, Santa Cruz, all of Calif.

[73] Assignee: Seagate Technology, Inc., Scotts Valley, Calif.

[21] Appl. No.: 09/078,430

[22] Filed: May 13, 1998

Related U.S. Application Data

[51] Int. Cl.⁶ ...................................................... H02K 5/24
[52] U.S. Cl. ............................................................. 310/51
[58] Field of Search ...................... 310/51, 67 R; 369/263, 266, 270, 98.07

[56] References Cited

U.S. PATENT DOCUMENTS

| | | | |
|---|---|---|---|
| 4,202,551 | 5/1980 | Darnall, Jr. | 369/263 |
| 4,833,667 | 5/1989 | Castagna et al. | 369/263 |
| 5,241,229 | 8/1993 | Kakatura et al. | 310/51 |
| 5,483,398 | 1/1996 | Boutaghou | 360/97.02 |
| 5,619,389 | 4/1997 | Dunfield et al. | 310/51 |

*Primary Examiner*—Nestor Ramirez
*Assistant Examiner*—Joseph Waks
*Attorney, Agent, or Firm*—Flehr Hohbach Test Albritton & Herbert LLP

[57] ABSTRACT

A disc drive spindle motor which has an increased resistance to operating and non-operating shock and vibration is provided, which improves the resistance to non-operating shock, is easy to manufacture and assemble, and which remains low in weight, low in height, and has low power consumption.

4 Claims, 2 Drawing Sheets

DAMPING INSERT AND ISOLATION PAD TO REDUCE ACOUSTIC LEVELS AND VIBRATION IN MOTOR AND DISC DRIVE

FIELD OF THE INVENTION

This invention relates generally to spindle motors for disc drives, and more particularly to designs incorporating features to reduce acoustic noise and damp vibrations.

BACKGROUND OF THE INVENTION

A disc drive assembly usually comprises one or more discs with information stored on annular tracks closely packed together to increase data density. The discs are fastened to or supported on a hub and are rotated at high speed to decrease the time it takes to obtain data via a sensing head which is substantially stationary with respect to the rotation of the disc. The head shifts radially across the tracks to sense data on different tracks.

Disc drive manufacturers and computer manufacturers typically establish standards for vibration and shock resistance for hard disc drives to be used for data storage. The standards may be even more stringent for disc drives intended for use in portable or lap top computers, or other difficult environments. Vibration and impact acceptance evaluation which qualify disc drives and the parts used therein for use in computers are frequently conducted by placing the drive to be evaluated on a vibration table, subjecting the drive to vibrations of varying frequency and amplitude while the drive is operating. The performance of the drive is monitored to determine the frequency and amplitude of the applied vibrations which cause errors in seeking and/or track following. Seek and/or track following errors often result in delays in reading and/or writing data, and disc drives which are sensitive to applied vibrations of too low a frequency or amplitude may fail acceptance evaluation.

One effect of vibrations applied to a disc drive, and a cause of errors of seeking or track following is mechanical off-tracking, i.e. an unintended physical movement of the heads with respect to the disc or discs. Mechanical off-tracking may be caused by movements of the various structural components of the spindle motor, causing the disc to tilt or wobble out of a plane normal to the axis of the motor spindle. Thus, improving the ability of a hard disc drive to withstand applied vibrations by improving the stability and shock absorbing ability of the spindle motor is a continuing goal of motor manufacturers.

However, among the further criteria imposed on hard disc drives in addition to resistance to vibrations is compactness, low weight, low power consumption, and ease of manufacturing. All of these criteria are important to computer manufacturers selecting a disc drive for use in a specific computer for a specific application. Thus, while reducing sensitivity of the spindle motor to applied vibrations is important, these other criteria must also be taken into account. Further, the resistance to applied vibration depends in part on the internal operating vibrations experienced by and absorbed by the spindle motor, because the applied and internal vibrations may act together under certain circumstances resulting in sufficient vibration to cause errors in seeking or track following.

In designing spindle motors for disc drives, all of the above must be taken into account. The spindle motor itself is generally comprised of three major elements; the stator, the rotor and the spindle. Thus, the objective is to dampen the vibrations applied to or created between any one or more of these pieces so that any shock or vibration applied to a part of the spindle motor is not transmitted through the rotating hub which is supported on the rotor and in turn supports the discs for rotation.

A further consideration is that spindle motors are generally separately assemble and then incorporated into the base of the disc drive. It is important that any vibration not be transmitted between the base and the spindle motor where it could create noise or displacement of the transducer relative to a target track.

SUMMARY OF THE INVENTION

It is therefore an object of the present invention to provide a disc drive spindle motor which has an increased resistance to operating and non-operating shock and vibration.

A further objective of the invention is to improve the resistance to non-operating shock.

It is another objective of the present invention to provide a motor which while resistant to vibration, remains easy to manufacture and assemble.

A further objective of the present invention is to provide a spindle motor which although having improved resistance to shock, remains low in weight, low in height, and has low power consumption.

These and other objectives of the present invention of having low acoustic noise and excellent vibration damping are achieved by a motor comprising a shaft bearing assembly constructed with a spacer separating the bearings. This assembly is mounted inside the hub. The hub supports a backiron and a magnet; a vibration isolation insert mounted to the motor base supports a wound lamination stack aligned with the magnet. This approach isolates the base from motor vibrations.

Damping pads are also attached to the bottom of the motor cartridge base, preferably laterally beyond the hub. This approach isolates the motor base from the disc housing base.

Other features and advantages of the present invention will become apparent to a person of skill in the art upon consideration of the following detailed description of a preferred embodiment presented in conjunction with the accompanying drawings.

DETAILED DESCRIPTION OF A PREFERRED EMBODIMENT

Figure 1:
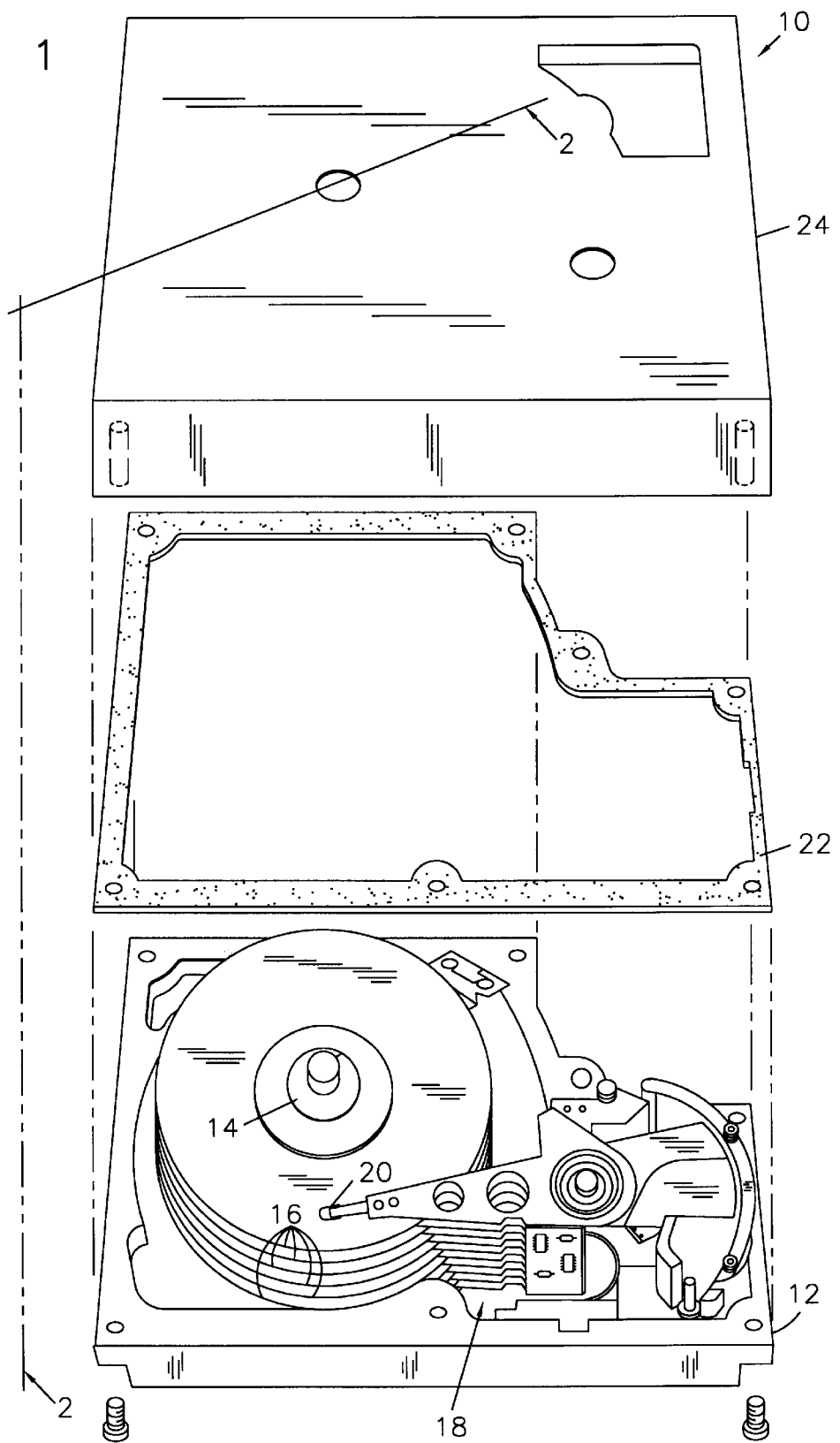
FIG. 1 is an exploded perspective view of a typical disc drive in which this invention is useful.

FIG. 1 is an exploded perspective view of a disc drive 10 of the type in which this invention is useful. The disc drive 10 includes a bottom casing or base 12 spindle motor whose spindle is indicated at 14, memory storage discs 16, actuator 18, magnetic head 20 which is supported from actuator 18 for movement over the surface of the disc. The assembly of the disc drive is completed with a gasket 22 and top casing 24 which is sealed to the bottom casing or base 12 to complete the assembly of the disc drive housing. The actuator 18 can be of any type which is well known in the technology and is mounted above base 12 so as to arcuately extend over the memory storage disc 16. As noted above, the actuator 18 carries at least one read/write magnetic head 20 above memory storage discs 16. The transducer as is well known flies at an extremely low height over the surface of the rotating disc; separation is measured in microns. Therefore, any tilt or wobble or vibration of the disc because of vibrations applied to or induced in the spindle motor 4 can lead to serious operational difficulties including off-tracking or mis-tracking of the transducer relative to the desired track, or even allowing the transducer head 20 to strike the surface of the disc which can damage the disc surface causing irrecoverable loss of data.

Figure 2:
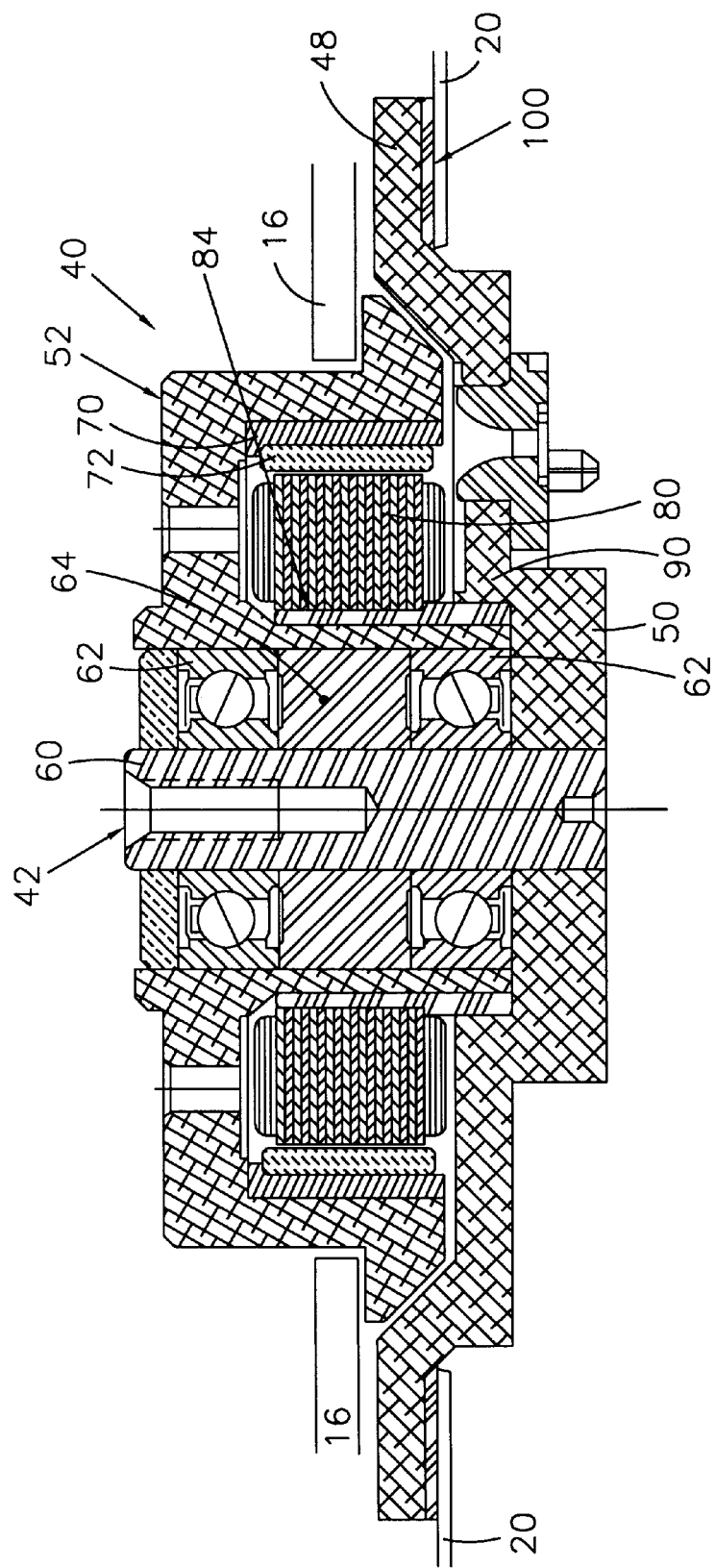
FIG. 2 is a vertical sectional view of a motor incorporating an embodiment of the present invention.

An exemplary embodiment showing the details of the present invention appears in FIG. 2. The spindle motor is shown mounted in the drive base 20. The motor is of a cartridge design, with the cartridge 40 being shown in FIG. 2, so that it can be dropped into the drive base 20. The motor is then fixed in place between the base 20 and the cover 24 with a screw being threaded into the screw hole 42 at the top of the shaft, and other fixtures being used to attach the portion of the motor base 50 which extends beyond the hub 52 to the base 20. As will be seen, the motor could be formed simply as a motor to be used for other purposes with at least one of the vibration-isolating elements being of substantial use in other fields than in disc drives.

Continuing with the description of this exemplary motor, it includes a shaft 60 and two bearings upper and lower bearings 62, separated by a spacer 64. The spacer separates and maintains alignment of the bearings 62. The hub 52 which rotates outside the bearing 62 supports a back iron 70 and magnet 72 with the magnet being cemented to the back iron. To support the spindle motor wound lamination stack 80 in its proper position aligned with the magnet 72, a vibration-isolating insert 84 is provided glued or otherwise affixed to the base 50. In this example, the axial face of the insert is cemented to the motor base; the insert is also cemented on its radial faces to an axially projecting feature 90 on the base 50. This design alone provides substantial isolation of the stator from the motor base. The vibration associated with energizing the windings 80 will therefore be damped prior to transmission to the motor base and preventing their being passed on to the thick shaft motor as frequently occurs.

In a further feature of this invention, an isolation damping pad 100 is placed between the base extension 48 which extends beyond the hub 52 and the portion of the base 20 which extension 48 overlies. This isolation damping pad serves as an additional isolator which isolates the motor assembly and especially the shaft and hub from any vibrations which may be applied to the base 20.

The result of this approach is that there is an overall reduction in acoustics and vibration levels of both the motor and the disc drive. Either of these features may be used alone; in combination they provide a highly effective isolation of the motor shaft and hub from vibrations associated with energization of the stator, and impacts to the disc drive housing. The invention described above can be applied to any motor application where the stator must be isolated from the motor base and the motor base isolated from the drive base to provide an optimum reduction in acoustics and vibration in the system. Other features and advantages to the present invention will occur to a person of skill in the art who studies the present invention disclosure. Therefore, the scope of the present invention is to be limited only by the following claims.

What is claimed is:

1. A motor having reduced sensitivity to shock and vibration mounted in a disc drive housing and supporting one or more discs for rotation, comprising a shaft supported from a base of said housing, a hub supported for rotation about said shaft, bearings mounted between said shaft and said hub for supporting said hub for rotation, said hub supporting a magnet on a radially inside surface thereof, said bearings comprising upper and lower bearings, each of said bearings having an inner race supporting said shaft and an outer race supporting said hub for rotation, a spacer between said upper and lower bearings for maintaining a relationship therebetween, a lower of said bearings resting on said base, and an acoustic isolating inert supported from said base extending axially parallel to said shaft and radially separated from said shaft by an axial portion of said hub supported on said outer race and supporting stator windings to interact with said magnet, said insert being superposed between said axial portion of said hub and between said stator windings, said stator being supported adjacent but acoustically isolated from said bearings.

2. A motor as claimed in claim 1 wherein said motor is mounted in said base, a radial extension of said base overlying a base member of a disc drive housing, and including an isolation damping pad between said motor base radial extension and said disc drive housing base.

3. A motor as claimed in claim 1 wherein said vibration damping material is supported from a radial face of an axial extension of said base.

4. A motor as claimed in claim 3 wherein said isolating insert extends fully along an axial dimension of said stator windings.

* * * * *